United States Patent [19]
Nishida

[11] Patent Number: 5,574,409
[45] Date of Patent: Nov. 12, 1996

[54] APPARATUS AND METHOD FOR ADJUSTING MICROWAVE BPSK MODULATOR AND MIXER

[75] Inventor: Masakazu Nishida, Tokyo, Japan

[73] Assignee: NEC Corporation, Tokyo, Japan

[21] Appl. No.: 547,874

[22] Filed: Oct. 25, 1995

[30] Foreign Application Priority Data

Oct. 25, 1994 [JP] Japan .................................. 6-260476

[51] Int. Cl.⁶ .............................. H04L 27/20; H04B 1/26
[52] U.S. Cl. ........................ 332/105; 332/146; 375/279; 455/325; 455/327; 455/330
[58] Field of Search .................................. 332/103, 105, 332/130, 144, 146; 455/42, 111, 325, 326, 327, 330; 375/279, 282, 283

[56] References Cited

U.S. PATENT DOCUMENTS 3,659,206  4/1972  Hallford ................................. 455/326
4,276,521  6/1981  Davidheiser ........................... 332/105
5,125,110  6/1992  Nusair .................................... 455/327
5,457,436  10/1995  Nishida et al. ......................... 332/146

FOREIGN PATENT DOCUMENTS 3-91341  4/1991  Japan .

Primary Examiner—Siegfried H. Grimm
Attorney, Agent, or Firm—Sughrue, Mion, Zinn, Macpeak & Seas

[57] ABSTRACT

Microwave two-phase modulator and mixer each comprising a balance/unbalance transformer section to which a microwave signal is applied; a synthetic/branching line section which is connected to the both ends of the balancing line of the balance/unbalance transformer section on the balancing line side; isolation diodes are mounted between diode-mounting lines section and fan-shaped patterns; a plurality of modulating characteristic-adjusting, capacitive stubs placed near the diode-mounting lines; an input line; a modulating signal input line; and a modulated signal output line. The modulating characteristics are adjusted by connecting the diode-mounting lines and the plurality of capacitive stubs by bonding wires or cutting some of the connecting wires.

20 Claims, 3 Drawing Sheets

APPARATUS AND METHOD FOR ADJUSTING MICROWAVE BPSK MODULATOR AND MIXER

BACKGROUND OF THE INVENTION

1. Field of the Invention

The present invention relates to the configuration of a BPSK (Binary Phase Shift Keying) modulator and a mixer which are used in microwave communications equipment and a method for adjusting them.

2. Description of the Prior Art

Microwave phase modulators of the prior art are constructed so as to produce phase-modulated waves by switching between signals in opposite phases which are generated with a $\lambda/2$ ($\lambda$ is the wavelength of the center frequency of the modulated wave) line, two diodes, etc.

FIG. 1 is a view illustrative of the configuration of such a prior art modulator.

In this drawing, a carrier microwave input line 18 and a semi-circle line 19 (a length of $\lambda/2$) are laid on a dielectric substrate 30. Connected to the midpoint of the $\lambda/2$ line 19 is a line 20 for applying a modulating signal (baseband signal).

Since the line 19 is $\lambda/2$ long, the signal has opposite phases at the input end and at the output end. In addition, diodes 21, 22 are placed in series connecting the two ends of the line 19, with an output line 23 extending from the point of connection between the diodes 21, 22.

These lines 19, 20, 23 are striplines on the substrate 30. In cases where the modulating signal applied to the line 20 is a pulse signal which causes switching with the diodes 21, 22, the signals in opposite phases which have been generated at the input and output ends are alternately output by switching with the diodes. As a result, BPSK (Binary Phase Shift Keyed) waves modulated to the 0 phase or the $\pi$ phase are output via the output line 23.

In cases where the signal input via the line 20 is at a signal level which allows operation of the diodes in a nonlinear characteristic region, that type of modulator of the prior art also serves as a mixer (frequency converter circuit) which provides output signals as balanced modulated signals at the sum frequency and the difference frequency of the two signals input via the line 18 and the line 20.

Such configuration is described in, for example, Japanese Published Unexamined Patent Application No.3-92341 (1991).

Although the above-described phase modulator of the prior art is indeed a microwave converter circuit in theory, in actuality it has a problem in that it is hard to mount the minute diodes on the dielectric substrate. There is an additional problem in that deviation from the ideal characteristics of the 0 phase and the $\pi$ phase are caused by asymmetry of the line patterns, variations in the patterns due to errors during manufacture, variations in characteristics of the diodes, etc. In addition, it is necessary to retrofit the modulator with a capacitive stub, for example, for phase adjustment in order to eliminate such deviation, and this complicated and difficult adjusting process presents another drawback.

More specifically, the material for the capacitive stub used for the adjustment is usually a piece of a metal such as iron or indium which is repeatedly soldered to or desoldered from an appropriate point for adjustment of the phase-modulating characteristics. This process also has a problem in that the size and the point of mounting of the metal piece and the amount of the solder have delicate effects on the characteristics, there are no guides for the point of attachment and the capacity of the capacitive stub, and therefore the process has an extremely poor working efficiency due to the poorly reproducible characteristics.

SUMMARY OF THE INVENTION

It is an object of the present invention to provide a microwave modulator and a microwave mixer with excellent characteristics which allow easy design for mounting a diode and placing a capacitive stub for adjustment of the characteristics, and which are specifically guided for the position of attachment of the capacitive stub, etc. and are easy to adjust.

It is another object of the present invention to provide a microwave modulator and a microwave mixer which allow quantitative adjustment of the characteristics by a combination of a plurality of stubs, and which are easily guided for the points of adjustment and the capacities and produce desired characteristics with a high degree of reproducibility.

It is an additional object of the present invention to increase the working efficiency by streamlining the entire manufacturing process without the difficult adjusting process, which elimination may be realized by implementing the adjustment of the characteristics by connection of the capacitive stubs by bonding wires or cutting off a connecting wire.

In order to accomplish the above objects, the present invention is realized by providing a microwave modulator or a microwave mixer which comprises a balance/unbalance transformer section, a synthetic/branching line section provided at the end of the balance/unbalance transformer section on the balancing line side and a pair of diode-mounting lines provided at the ends of the balancing lines, with a configuration which allows provision of one or more characteristic-adjusting, capacitive stubs near the pair of diode-mounting lines and connection between the diode-mounting lines and the capacitive stubs by metal wires. Here, at least two capacitive stubs with an area ratio in a series of multiples of two are provided, and part or all of the capacitive stubs are connected in advance by metal wires to the diode-mounting lines.

Also, according to the present invention, a method for adjusting the characteristics of such a microwave modulator and mixer comprises adjustment by connecting the diode-mounting lines and the capacitive stubs by bonding wires or cutting the preconnected wires.

BRIEF DESCRIPTION OF THE DRAWINGS

Referring now to the drawings.

DETAILED DESCRIPTION OF THE PREFERRED EMBODIMENTS

Figure 2:
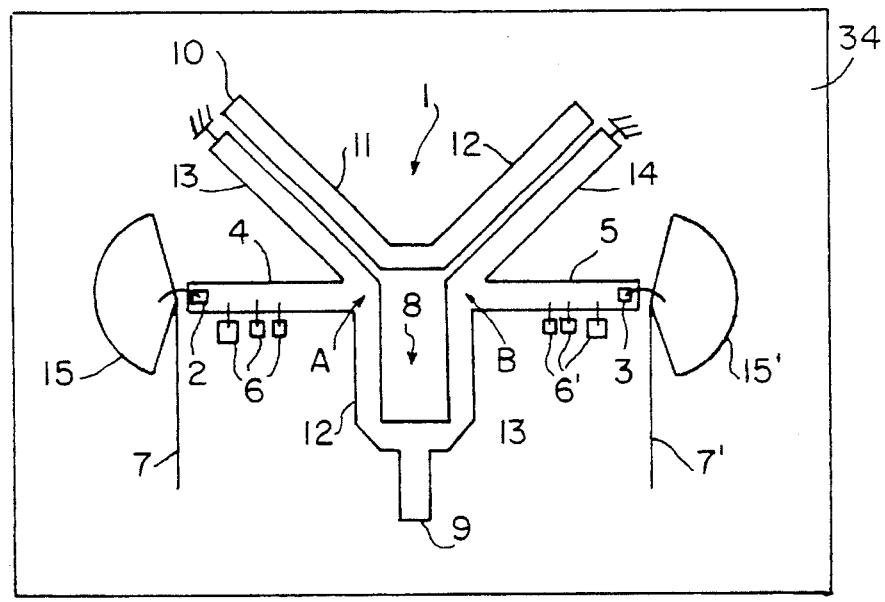
FIG. 2 is a view illustrative of the inside of a dielectric substrate according to an embodiment of the modulator of the present invention.

FIG. 2 is a view illustrative of the configuration of an embodiment of the modulator according to the present invention. The one illustrated is an instance of a two-phase modulator, the configuration and the operation of which will now be explained. This modulator is constructed with a balance/unbalance transformer section 1 to which a microwave signal is applied; a synthetic/branching line section 8 which is connected to balancing output ends A and B of the transformer section 1 on the balancing line side; lines 4, 5 which extend from the ends A and B; fan-shaped patterns 15, 15' which are provided near the ends of the lines 4, 5 and are maintained at ground potentials in response to high frequencies; low-frequency signal applying lines 7, 7' which are connected to the fan-shaped patterns 15, 15'; diodes 2, 3 which are mounted between the lines 4, 5 and the fan-shaped patterns 15, 15' in the same or opposite directions in terms of the directions of the current through the lines 7, 7'; and a plurality of characteristic-adjusting, capacitive stubs 6, 6' which are provided near the lines 4, 5.

In addition, the balance/unbalance transformer section 1 is composed of a Marchand balun comprising an unbalancing line 11 of length approximately $\lambda/4$ which extends from the end of the line 10 through which a microwave signal is applied; another unbalancing line 12 of length approximately $\lambda/4$ which extends from the end of the unbalancing line 11; and balancing lines 13, 14 of length approximately $\lambda/4$ on the output side which are placed in a combined manner at positions facing the lines 11, 12 and are grounded at the respective one ends. The synthetic/branching line section 8 is composed with line patterns consisting of lines 12, 13 of length approximately $\lambda/4$ and an output line 9, wherein the $\lambda/4$ lines 12, 13 constitute line patterns which are connected to the ends of the balancing lines 13, 14.

This modulator is usually constructed with striplines, wherein the constituent line patterns described above are formed of a metal such as gold or silver laid on a ceramic substrate 34 comprising alumina or the like, and another substrate 35 of the same or similar type material is laid thereon to provide a construction based on a sandwich structure.

Figure 3:
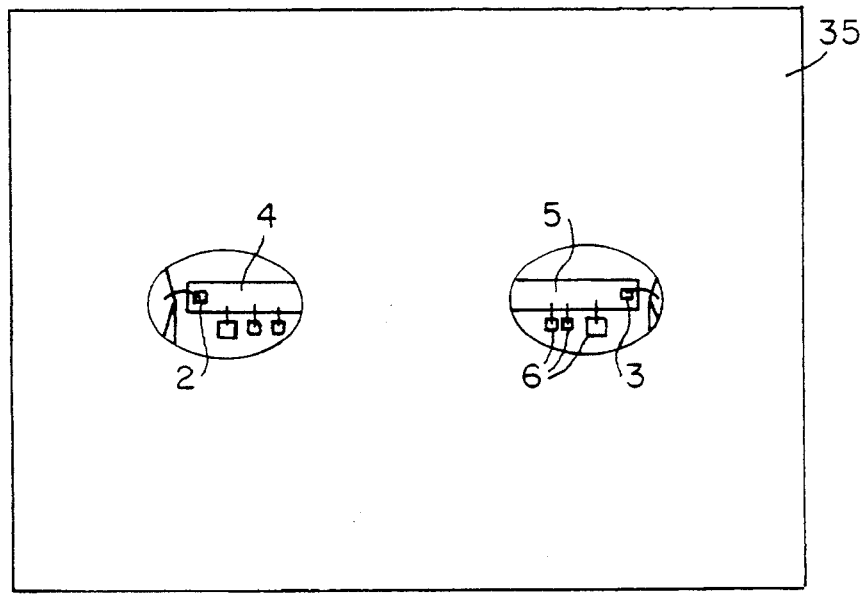
FIG. 3 is a view illustrative of the entirety of a dielectric substrate according to another embodiment of the modulator of the present invention.

FIG. 3 is a view illustrative of this sandwich structure of the substrate 34 and the substrate 35. Here, the $\lambda/4$ lines 4, 5 are provided only for convenience in manufacturing the modulator, as will be described in detail later, and holes (windows) are bored in sections of the lines near the ends to allow mounting of the diodes 2, 3 from the upper substrate side and adjustment with one or more capacitive stubs.

The operation of the modulator as a two-phase modulator will now be explained.

In FIG. 2, a microwave signal supplied from a local oscillator or the like (not shown) is applied via the input line 10, while baseband modulating signals in opposite phases are applied via the lines 7, 7' (provided that the diodes 2, 3 are connected in the reverse directions as defined above). The microwave signal is transformed from an unbalanced signal to a balanced signal through the balance/unbalance transformer section 1 to generate microwave signals in opposite phases at the ends A and B of the balancing lines 13, 14. The switching diodes 2, 3 are connected to the ends A and B via the extension lines 4, 5 of length approximately $\lambda/4$, and are alternately turned on and off in response to pulse signals supplied via the lines 7, 7'. Since the end of the conducting diode is substantially grounded in response to the high frequency, the microwave is prevented from being output via the end, while the other microwave signal is output through the end of the diode out of conduction. As a result, the microwave signals, which are propagated from the ends A and B to the line 9 via the $\lambda/4$ lines 12, 13 which constitute the synthetic/branching line section 8, are at either the 0 phase or the $\pi$ phase, and thus two-phase modulated signals are output. Here, although the pulse signals applied via the lines 7, 7' are supplied as signals in opposite phases when the diodes are connected in the reverse directions, they may be in phase in the case where they are connected in the same direction, in which case the lines 7, 7' may be combined into one.

As easily understood from the operation of the modulator which has been explained above, in theory the diodes 2, 3 may be directly mounted at the ends A and B of the balancing lines. Actually, however, it is difficult to bore minute holes for mounting the diodes in the ceramic substrate above the two ends A and B of the respective balancing lines, and more importantly in cases where large holes are bored to house the two diodes, the adjacent balancing lines may be placed too closely causing leakage of the microwaves between the lines 12, 13, though the difficulty in manufacture is avoidable. For this reason, the line patterns 4, 5 are provided to connect the diodes 2, 3 at positions apart from the balance/unbalance transformer section 1 and the synthetic/branching line section 8. As a result, the diodes are located apart from the transformer section 1 and the line patterns, including the synthetic/branching line section 8, at least by a length of approximately $\lambda/4$, and this configuration eases the constraints on the manufacture of the upper substrate and boring sufficiently large-sized holes.

As described above, the present invention effectively utilizes the symmetric line patterns provided only for necessity of facilitating the manufacture of the modulator, to place one or more capacitive stubs in spacious areas apart from the other circuit patterns, thus allowing adjustment of the characteristics with an increased responsiveness using the one or more capacitive stubs.

The arrangement of the capacitive stubs and a method for adjusting the characteristics with the stubs, which are characteristic of the present invention, will now be explained with reference to the above embodiment.

Figure 1:
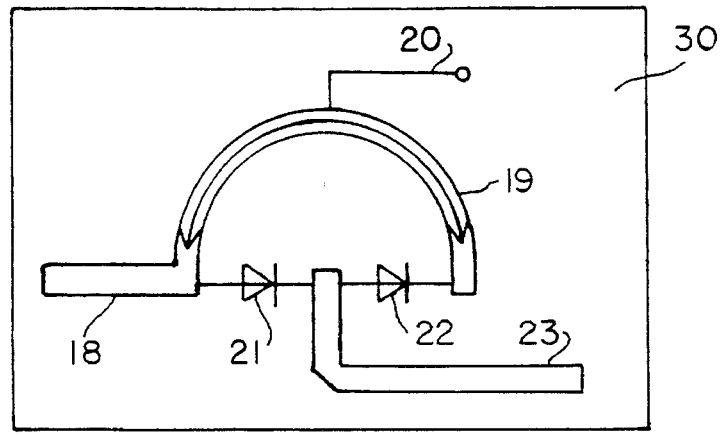
FIG. 1 is a view illustrative of the configuration of a modulator of the prior art.

As apparent from the configuration explained above, the modulator according to the present invention comprises bilaterally symmetric line patterns which contribute to much more excellent modulating characteristics than with the conventional asymmetrically patterned modulator shown in FIG. 1. However, with the modulator according to the present invention, the characteristics may be impaired under the influence of the capacity introduced by the mounted diodes, unwanted reactance of inductances, etc., the unbalance of the characteristics of the two diodes, displacement of the line patterns, poor manufacturing accuracy and the approximately λ/4 lines 4, 5 which are provided for convenience in manufacturing the modulator and are not requisites for the circuit in theory. In order to adjust such characteristics, it is effective to mount capacitive stubs on the approximately λ/4, bilaterally symmetric lines 4, 5. It is also possible to effectively adjust the input or output impedance of the modulator with the bilaterally symmetric capacitive stubs. The embodiment illustrated in FIG. 2 is constructed so as to adjust the characteristics by properly connecting a plurality of capacitive stub patterns 6, 6' which have been formed in advance near but below the approximately λ/4 lines 4, 5, with the lines 4, 5 by bonding wires or the like.

The sizes and the positions of the capacitive stubs 6, 6' may be preliminarily determined with advantages utilizing the ample spaces left for attachment of the capacitive stubs. More specifically, the stub patterns are designed so as to have an area ratio in a sequence of multiples of two, including 1, 2, 4, 8, . . . , and the capacitive stubs are placed in advance at optimum positions which are expected to allow connections which result in effective adjustment of the characteristics. With this configuration, mere combination of proper connections between the capacitive stubs leads to establishment of connections between the stubs which may provide any desired capacity, thus rendering the adjustment a quantitative operation. In addition, a quantitative, positional guide for the adjustment may be easily established to exploit the desired characteristics, and the possibility of reproducing the desired modulating characteristics may be drastically increased.

Figure 4:
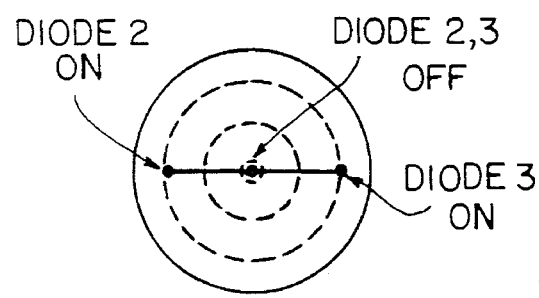
FIG. 4 is a view illustrative of a Smith chart which shows ideal modulating characteristics of modulators according to the present invention.
Figure 5:
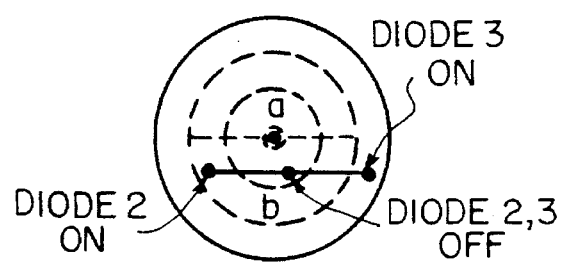
FIG. 5 is a view illustrative of a Smith chart which shows actual modulating characteristics of a modulator according to the present invention.

Ideal modulating characteristics of a phase modulator are shown in the Smith chart in FIG. 4, where a great degree of isolation is afforded at the point at which the two diodes are out of conduction, and the modulating characteristics include lowered degrees of errors in modulation angle and amplitude deviation. In practice, however, the modulating characteristics tend to be as shown in FIG. 5 because the non-retrofitted modulator exhibits variations in its characteristics due to variations in properties of the diodes, different lengths of wires connecting the diodes, displacement of the λ/4 lines 4, 5, etc. Therefore, referring to the characteristics, the plurality of capacitive stubs are connected by wires to bring the isolated point "b" closer to the point "a" as shown in FIG. 5, and a balance is established to minimize errors in the modulation angle and the amplitude deviation, thereby correcting and adjusting the characteristics of the modulator. The above-described adjustment with the capacitive stubs may also be applied to adjustment of input/output impedance and to improvement of the transient response characteristics with respect to the microwave input line and output line.

Figure 6:
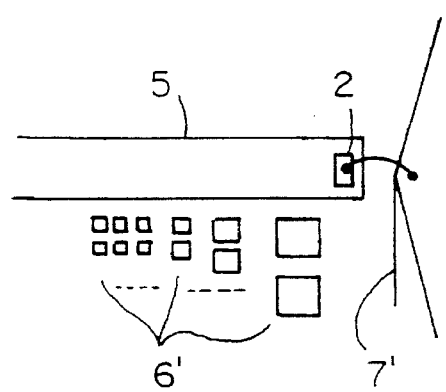
FIG. 6 is a view illustrative of capacitive stubs for a modulator of the present invention which are provided under a line.
Figure 7:
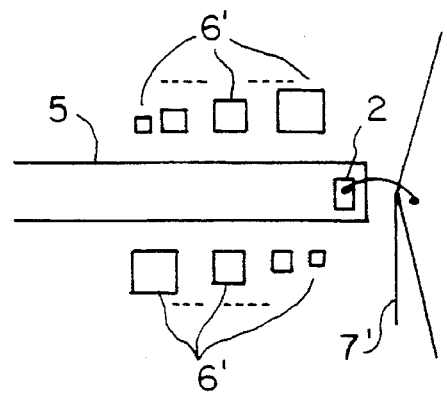
FIG. 7 is a view illustrative of capacitive stubs for a modulator of the present invention which are provided above and under a line.
Figure 8:
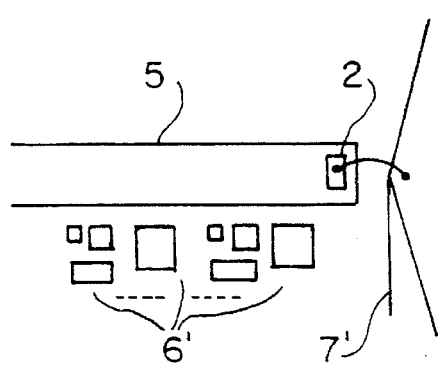
FIG. 8 is a view illustrative of capacitive stubs for a modulator of the present invention which are provided under a line in a scattered manner.
Figure 9:
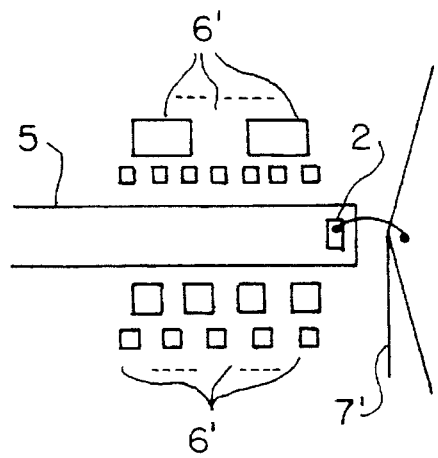
FIG. 9 is a view illustrative of capacitive stubs for a modulator of the present invention which are provided above and under a line in a scattered manner.

Although the capacitive stubs according to the present embodiment are placed below the lines 4, 5 as patterns of squares with an area ratio of 1 : 2 : 4, they may be shaped otherwise as desired, and there may be presented a plurality of patterns of the same area, as shown in FIG. 6. In addition, as shown in FIGS. 7, 8 and 9, patterns of the stubs may be appropriately arranged above or at both sides of the lines in addition to below the lines, in a scattered manner; other possible various arrangements include proper arrangement of a series of multiples of two patterns of the stubs at optimum positions. In addition, since the line lengths of the λ/4 lines 4, 5 are required to be slightly longer or shorter than λ/4 in some cases depending on the characteristics of the used diodes, the pattern of arrangement of the capacitive stubs are also designed in consideration of the relative relationship with such changes in size.

In addition to adjustment with all the plurality of the capacitive stubs connected by bonding wires, the adjustment with the capacitive stubs may be carried out efficiently by adjustment with some, but the requisite minimum number of capacitive stubs connected in advance by bonding wires; the stubs may be varied by increasing the number, cutting, reconnection, etc. as necessary.

In cases where all the capacitive stubs are connected in advance in the manufacturing step, the adjustment may be conducted in the later testing and adjusting step by cutting some of the connecting wires as necessary while referring to the characteristics which are monitored, and this results in a shorter time of adjustment. Adoption of this method of adjustment allows separation of the manufacturing step and the testing and adjusting step, thus allowing streamlining of the entire operation for increased working efficiency.

Figure 10:
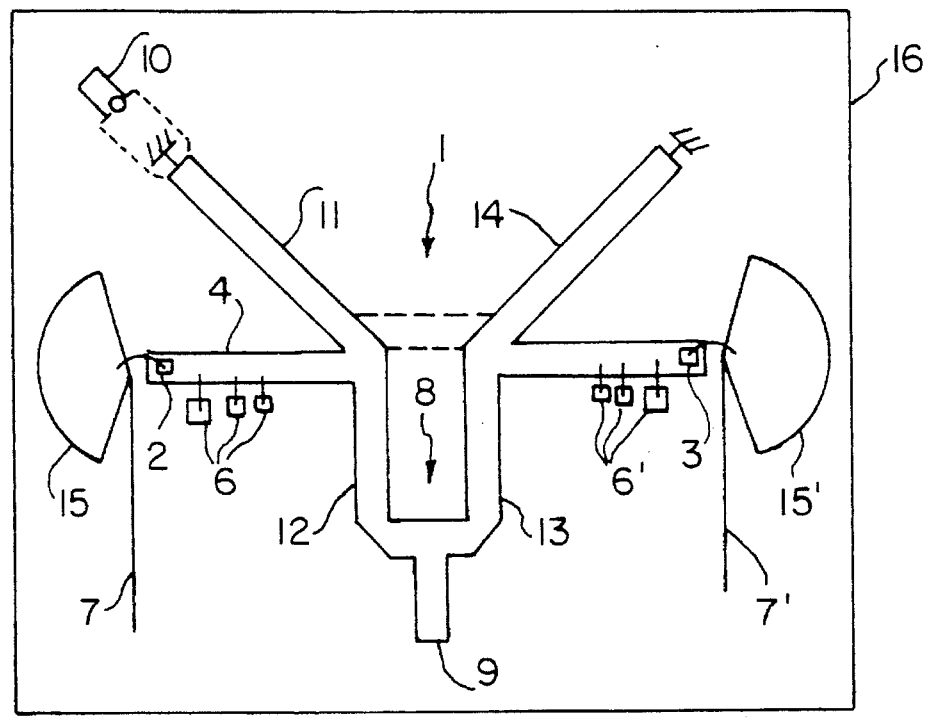
FIG. 10 is a view illustrative of a laminated dielectric substrate for a modulator of the present invention, when viewed from above.
Figure 11:
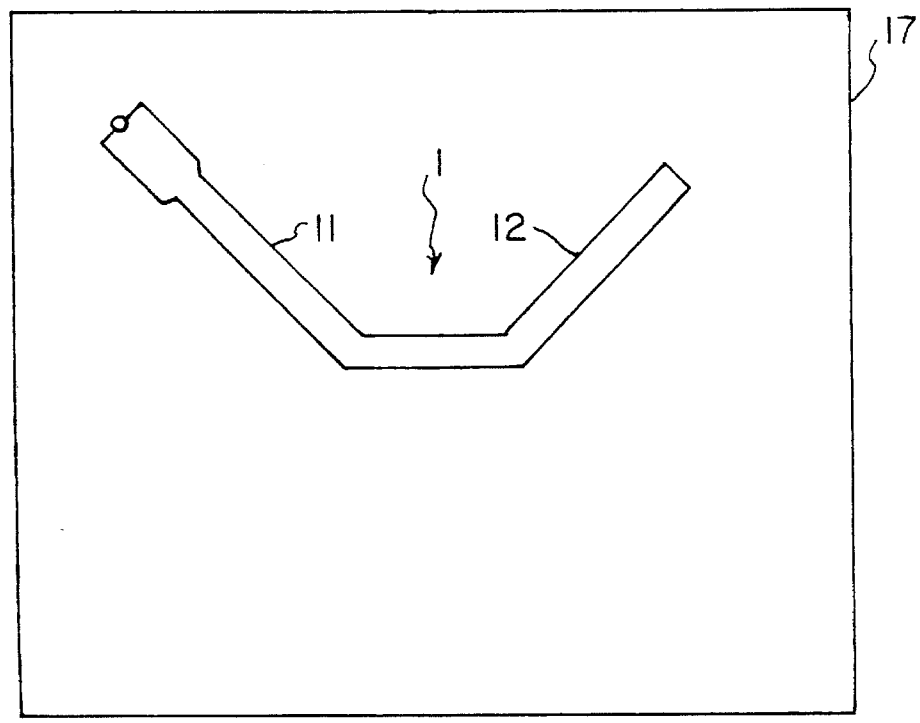
FIG. 11 is a view illustrative of the laminated dielectric substrate for a modulator of the present invention, when viewed from below.

Although the embodiment of the present invention explained above is in reference to a modulator based on a sandwich structure, the present invention may be implemented otherwise without being limited thereto; it is also possible to provide two or more layers to construct a modulator in the inner layer and to accomplish the adjustment from the surface layer side through two windows which may be provided as described above. The adjustment may also be carried out with a configuration constructed with circuit patterns placed on a plurality of ceramic substrates as illustrated in FIGS. 10 and 11. The illustrated configuration is a lamination composed of an upper ceramic substrate 16 consisting mainly of circuit patterns of balancing lines 13, 14 and others of a balance/unbalance transformer section 1 placed thereon, and another lower ceramic substrate 17 with circuit patterns of unbalancing lines 11, 12 placed thereon.

The balance/unbalance transformer section 1 may comprise any of a variety of impedance converters as well as a Marchand balun. For example, slot lines or coplanar lines may be used. Also, regarding the synthetic/branching line section 8, it will be apparent that various Wilkinson types of synthetic/branching line patterns may be used in addition to the pattern of the configuration illustrated in FIG. 2.

The lines 4, 5 for mounting the diodes 2, 3 are not limited to those with structures extending at right angles to the lines 12, 13. In other words, the lines may be extended downward from the ends A and B in slanting directions to ensure ample space for placement of the capacitive stubs above the lines. Diodes available for use include PIN diodes, Schottky barrier diodes, etc.

Further, although the embodiment explained above has the balance/unbalance transformer section 1 as the input side of the modulator and the synthetic/branching line section 8 as the output side, the modulator may, of course, be operated with a reverse input/output relationship. In this case, the modulator operates so that a microwave signal supplied via the line 9 is branched into in-phase signals through the branching line section 8, the resulting two signals are subjected to switching at the ends A and B and two-phase modulated through the balance/unbalance transformer section 1 into modulated signals at either the 0 phase or the λ phase which are output via the line 10.

In addition, although the above embodiment of the present invention was explained with reference to a two-phase modulator, it should also be mentioned that balanced modulated signals are output in cases where the signals to be applied through the signal lines 7, 7' are set at levels which allow operation of the diodes in a nonlinear characteristic region, and thus the modulator may be used as a frequency mixer. More specifically, referring to FIG. 2, the signal lines 7, 7' may be combined into one line through which an IF signal is input, while a local oscillator signal is input via the line 10 to output a frequency-modulated signal via the line 9, provided that the diodes are in opposite directions.

The present invention is based on effective use of the symmetric $\lambda/4$ line patterns provided only for convenience in mounting diodes for the manufacture of a modulator or a mixer, to provide one or more capacitive stubs, which allow adjustment of the characteristics, with ample spacing apart from the other line patterns.

According to the present invention, it is possible to provide a microwave modulator and a microwave mixer with excellent characteristics which allow easy design for mounting diodes and placing a capacitive stub for adjustment of the characteristics, and which are specifically designed for positioning the attachment of the capacitive stub, etc. with easy adjustment.

Also, according to the present invention, it is possible to provide a microwave modulator and a microwave mixer which allow quantitative adjustment of the characteristics by a combination of a plurality of stubs with an area ratio in a series of multiples of two, and which allow easy adjustment of the capacities to produce desired characteristics with a high degree of reproducibility.

According to the present invention, it is also possible to use bonding wires in a method for mounting the capacitive stubs which facilitate adjustment. More specifically, the adjustment time may be shortened by adopting a method which comprises connecting the capacitive stubs in advance in the manufacturing step and cutting some of the connecting wires for adjustment in the testing and adjusting step. In addition, adoption of this adjustment method allows separation of the manufacturing step and the testing and adjusting step, thus streamlining the entire operation for increased working efficiency.

What is claimed is:

1. A microwave BPSK modulator comprising:
    a balance/unbalance transformer section which comprises unbalancing lines for inputting or outputting a microwave signal and balancing lines for transforming said signal from said unbalancing lines to a balanced signal;
    a synthetic/branching line section which is provided at the ends of the balancing lines of said balancing/unbalancing transformer section and outputs said balanced signal as a synthetic signal or the input microwave signal as branched signals;
    a pair of diode-mounting lines which are provided at the ends of the balancing lines;
    one or more modulating characteristic-adjusting, capacitive stubs which are provided near the ends of said pair of diode-mounting lines;
    a pair of diodes which are mounted at the ends of said pair of diode-mounting lines; and
    a pair of lines which are connected to said pair of diodes and input modulating signals which subject said balancing signal to two-phase modulation.

2. A microwave BPSK modulator as claimed in claim 1, which is mounted on the inner layer of a plurality of layers which constitute a dielectric substrate, with windows bored from the surface layer to said inner layer which supports said modulating characteristic-adjusting, capacitive stubs and said pair of diodes.

3. A microwave BPSK modulator as claimed in claim 1, wherein connections between said diode-mounting lines, said modulating characteristic-adjusting, capacitive stubs and said pair of diodes are established by metal wires.

4. A microwave BPSK modulator as claimed in claim 3, wherein part or all of said capacitive stubs are connected in advance by the metal wires.

5. A microwave BPSK modulator as claimed in claim 1, wherein said balance/unbalance transformer section is composed of a Marchand balun, said balancing lines and said unbalancing lines each being of length approximately $\lambda/4$, where $\lambda$ is the wavelength of the center frequency of said microwave signal.

6. A microwave BPSK modulator as claimed in claim 1, wherein said modulating characteristic-adjusting, capacitive stubs are composed of at least two metal pieces with an area ratio in a series of multiples of two.

7. A microwave BPSK modulator as claimed in claim 2, wherein said dielectric substrate has a laminated structure so that said balancing lines and the other constituents may be mounted on separate layers of the laminated structure.

8. A microwave BPSK modulator as claimed in claim 1, wherein said synthetic/branching line section has a length of approximately $\lambda/4$.

9. A microwave mixer comprising:
    a balance/unbalance transformer section which comprises unbalancing lines for inputting or outputting a microwave signal and balancing lines for transforming said signal from said unbalancing line to a balanced signal;
    a synthetic/branching line section which is provided at the ends of the balancing lines of said balancing/unbalancing transformer section and outputs said balanced signal as a synthetic signal or the input microwave signal as branched signals;
    a pair of diode-mounting lines which are provided at the ends of the balancing lines;
    one or more modulating characteristic-adjusting, capacitive stubs which are provided near the ends of said pair of diode-mounting lines;
    a pair of diodes which are mounted in opposite directions at the ends of said pair of diode-mounting lines; and
    a line which is connected to said pair of diodes and inputs an IF signal to generate a balanced modulated wave.

10. A microwave mixer as claimed in claim 9, which is mounted on the inner layer of a plurality of layers which constitute a dielectric substrate, with windows bored from the surface layer to said inner layer which support said modulating characteristic-adjusting, capacitive stubs and said pair of diodes.

11. A microwave mixer as claimed in claim 9, wherein connections between said diode-mounting lines, said modulating characteristic-adjusting, capacitive stubs and said pair of diodes are established by metal wires.

12. A microwave mixer as claimed in claim 11, wherein part or all of said capacitive stubs are connected in advance by the metal wires.

13. A microwave mixer as claimed in claim 9, wherein said balance/unbalance transformer section is composed of a Marchand balun, said balancing lines and said unbalancing lines each being of length approximately $\lambda/4$, where $\lambda$ is the wavelength of the center frequency of said microwave signal.

14. A microwave mixer as claimed in claim 9, wherein said modulating characteristic-adjusting, capacitive stubs are composed of at least two metal pieces with an area ratio in a series of multiples of two.

15. A microwave mixer as claimed in claim 10, wherein said dielectric substrate has a laminated structure so that said balancing lines and the other constituents may be mounted on separate layers of the laminated structure.

16. A microwave mixer as claimed in claim 9, wherein said synthetic/branching line section has a length of approximately $\lambda/4$.

17. A method for adjusting the modulating characteristics of a microwave BPSK modulator as claimed in claim 1, which comprises connecting said diode-mounting lines and said modulating characteristic-adjusting, capacitive stubs by bonding wires.

18. A method for adjusting the modulating characteristics of a microwave BPSK modulator as claimed in claim 4, which comprises cutting some of said metal wires with reference to the modulating characteristics which are monitored.

19. A method for adjusting the modulating characteristics of a microwave mixer as claimed in claim 9, which comprises connecting said diode-mounting lines and said modulating characteristic-adjusting, capacitive stubs by bonding wires.

20. A method for adjusting the modulating characteristics of a microwave mixer as claimed in claim 12, which comprises cutting some of said metal wires with reference to the modulating characteristics which are monitored.

* * * * *